(12) United States Patent
Xiao et al.

(10) Patent No.: US 12,255,697 B2
(45) Date of Patent: Mar. 18, 2025

(54) DATA TRANSMISSION METHOD AND APPARATUS, DEVICE, AND STORAGE MEDIUM

(71) Applicant: ZTE CORPORATION, Shenzhen (CN)

(72) Inventors: Huahua Xiao, Shenzhen (CN); Zhaohua Lu, Shenzhen (CN); Chuangxin Jiang, Shenzhen (CN); Shujuan Zhang, Shenzhen (CN); Shijia Shao, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 398 days.

(21) Appl. No.: 17/790,302

(22) PCT Filed: Feb. 4, 2021

(86) PCT No.: PCT/CN2021/075188
§ 371 (c)(1),
(2) Date: Jun. 30, 2022

(87) PCT Pub. No.: WO2021/160010
PCT Pub. Date: Aug. 19, 2021

(65) Prior Publication Data
US 2023/0052896 A1 Feb. 16, 2023

(30) Foreign Application Priority Data

Feb. 14, 2020 (CN) .......................... 202010093838.5

(51) Int. Cl.
*H04B 17/309* (2015.01)
*H04B 17/382* (2015.01)
*H04W 16/14* (2009.01)

(52) U.S. Cl.
CPC ......... *H04B 17/382* (2015.01); *H04B 17/309* (2015.01); *H04W 16/14* (2013.01)

(58) Field of Classification Search
CPC ....... H04B 17/309; H04B 17/382; H04L 1/08; H04L 1/1864; H04L 1/1887; H04L 1/189;
(Continued)

(56) References Cited

U.S. PATENT DOCUMENTS

2019/0334688 A1 10/2019 Kwak et al.
2021/0036826 A1* 2/2021 Wikström ................. H04L 1/08

FOREIGN PATENT DOCUMENTS

| CN | 110035527 A | 7/2019 |
|---|---|---|
| CN | 110431791 A | 11/2019 |

(Continued)

OTHER PUBLICATIONS

European Patent Office. Extended European Search Report for EP Application No. 21753589.7, mailed Feb. 27, 2024, pp. 1-8.

(Continued)

*Primary Examiner* — Melvin C Marcelo
*Assistant Examiner* — Natali Pascual Peguero
(74) *Attorney, Agent, or Firm* — Vivacqua Crane, PLLC

(57) ABSTRACT

Disclosed are a data transmission method and apparatus, a device, and a non-transitory computer-readable storage medium. The data transmission method may include: acquiring K physical shared channel patterns; and performing repetition transmission on data to be transmitted according to the K physical shared channel patterns, where K is an integer greater than 1.

18 Claims, 5 Drawing Sheets

(58) Field of Classification Search
CPC ... H04L 5/0044; H04L 5/0053; H04L 1/0003; H04L 1/0009; H04L 5/005; H04W 16/14
See application file for complete search history.

(56) References Cited

FOREIGN PATENT DOCUMENTS

| | | | |
|---|---|---|---|
| CN | 111901055 | A | 11/2020 |
| EP | 3609104 | A1 | 2/2020 |
| WO | 2019158013 | A1 | 8/2019 |
| WO | 2019160464 | A1 | 8/2019 |

OTHER PUBLICATIONS

3GPP Technical Specification Group Radio Access Network. "Discussion on downlink DMRS design," 3GPP Tsg Ran WG1 Meeting, May 15-19, 2017, pp. 1-11.

International Searching Authority. International Search Report and Written Opinion for PCT Application No. PCT/CN2021/075188 and English translation, mailed Apr. 23, 2021, pp. 1-11.

* cited by examiner

DATA TRANSMISSION METHOD AND APPARATUS, DEVICE, AND STORAGE MEDIUM

CROSS-REFERENCE TO RELATED APPLICATION

This application is a national stage filing under 35 U.S.C. § 371 of international application number PCT/CN2020/075188, filed Feb. 4, 2021, which claims priority to Chinese patent application No. 202010093838.5, filed on Feb. 14, 2020. The contents of these applications are incorporated herein by reference in their entirety.

TECHNICAL FIELD

The present disclosure relates to the technical field of radio communications, for example, to a data transmission method and apparatus, a device, and a non-transitory computer-readable storage medium.

BACKGROUND

In Long Term Evolution (LTE), Long Term Evolution-Advanced (LTE-A), New Radio Access Technology (NR), and other standards, application scenarios which are demanding in terms of reliability can be found, such as Ultra-Reliable and Low Latency Communications (URLLC), massive Machine Type of Communication (mMTC), and New Radio Access Technology light (NR light). Repetition transmission includes single-point and multi-point repetition transmission, which is an effective technology for improving reliability. In addition, joint transmission or reception of multiple transmission and reception points (Multi-TRP) means that the multiple TRPs jointly transmit data or signals for at least one user. In related technical fields, multi-panel transmission is an important technology introduced by NR, where multiple antenna panels are mounted at a receiver and/or a sender to improve the spectrum efficiency or reliability of a radio communication system. However, repetition transmission needs to occupy multiple resources a fixed number of times, resulting in high performance overheads.

SUMMARY

The present disclosure provides a data transmission method and apparatus, a device, and a non-transitory computer-readable storage medium.

An embodiment of the present disclosure provides a data transmission method which is applied to a sender, which may include: acquiring K physical shared channel patterns; and performing repetition transmission on data to be transmitted according to the K physical shared channel patterns, where K is an integer greater than 1.

A further embodiment of the present disclosure provides a data transmission method which is applied to a receiver, which may include: receiving at least one datum to be transmitted; and demodulating the data to be transmitted according to at least one physical shared channel pattern.

A further embodiment of the present disclosure provides a data transmission apparatus which is applied to a sender, which may include: a pattern acquisition module configured to acquire K physical shared channel patterns; and a data transmission module configured to perform repetition transmission on data to be transmitted according to the K physical shared channel patterns, where K is an integer greater than 1.

A further embodiment of the present disclosure provides a data transmission apparatus which is applied to a receiver, which may include: a data receiving module configured to receive at least one datum to be transmitted; and a data demodulation module configured to demodulate the data to be transmitted according to at least one physical shared channel pattern.

A further embodiment of the present disclosure provides a device, which may include: at least one processor; and a memory configured to store at least one program, where the at least one program, when executed by the at least one processor, causes the at least one processor to implement any of the data transmission methods according to the embodiments of the present disclosure.

A further embodiment of the present disclosure provides a non-transitory computer-readable storage medium storing a computer program which, when executed by a processor, causes the processor to implement any of the data transmission methods according to the embodiments of the present disclosure.

According to the technical scheme of the embodiments of the present disclosure, repetition transmission is performed on the data to be transmitted through the pre-configured physical shared channel patterns, so that high-reliability data transmission is realized, and resource occupation in repetition transmission is reduced.

DETAILED DESCRIPTION

Figure 1:
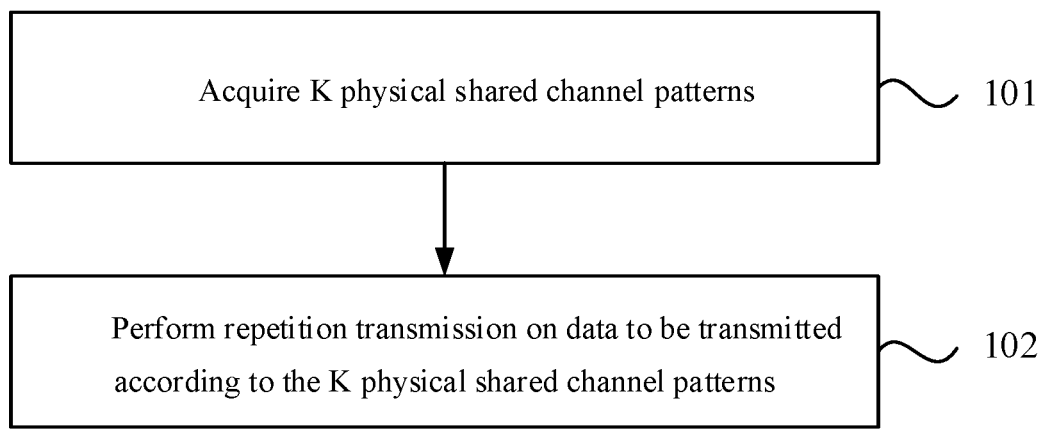
FIG. 1 is a flowchart of a data transmission method provided by an embodiment of the present disclosure.

The embodiments of the present disclosure will be described below with reference to the accompanying drawings.

The steps shown in the flowcharts of the drawings may be performed in a computer system, such as with a set of computer-executable instructions. Moreover, although a logical order is shown in the flowcharts, the steps shown or described may be performed, in some cases, in a different order than shown or described herein.

For the convenience of description, some concepts used herein are introduced below.

In the embodiments of the present disclosure, panels and port groups (antenna port group, antenna group) are in one-to-one correspondence in an interchangeable manner. The panels refer to antenna panels, and each TRP or terminal device may include at least one antenna panel. at least one antenna array is provided on each panel, and multiple arrays can be virtualized into one antenna port. Panel here can be replaced by port group (or spatial parameters, such as sent beam, received beam, quasi-co-location type D, and transmission configuration indicator state (TCI state)).

In the present disclosure, identifier (ID) is used for identifying a serial number, index or indicator of a thing, such as reference signal resource, reference signal resource group, reference signal resource configuration, channel state information (CSI) report, CSI report set, terminal device, base station, panel, etc.

In the present disclosure, index and indicator are interchangeable. Transmission in the present disclosure may refer to sending and receiving. For example, transmission of signals or data may refer to sending or receiving of data or signals. Signals here include various reference pilot signals.

To transmit data or signaling, in the standards, physical channels are divided into physical downlink control channel (PDCCH), physical uplink control channel (PUCCH), physical downlink shared channel (PDSCH) and physical uplink shared channel (PUSCH). Here, PDCCH is mainly used for transmitting physical downlink control information (DCI), while PUCCH is mainly used for transmitting uplink control information, such as channel state information (CSI), hybrid automatic repeat request (HARM), scheduling request, etc. PDSCH is mainly used for transmitting downlink data, while PUSCH is mainly used for transmitting information such as uplink data and CSI. Here, CSI includes downlink channel state information fed back by a terminal device and uplink channel state information of the terminal device indicated by a base station. Here, downlink channel state information includes but is not limited to one of the following information: CSI-reference signal resource indicator (CRI), synchronization signals block resource indicator (SSBRI), channel quality indicator (CQI), precoding matrix indicator (PMI), layer indicator (LI), or rank indicator (RI); and uplink channel state information includes but is not limited to one of the following information: uplink sounding reference signal resource indicator (SRS resource indicator, SRI), transmitted precoding matrix indicator (TPMI), transmitted rank indicator (TRI), and modulation and coding scheme (MCS), where TPMI and TRI may be jointly coded and indicated by precoding information and number of layers of downlink control signaling. Here, physical downlink shared channel and physical uplink shared channel are collectively referred to as physical shared channel, and physical downlink control channel and physical uplink control channel are collectively referred to as physical control channel.

For the flexibility of resource allocation and scheduling, a scheduled resource may include a slot or a sub slot, where one slot may include at least one sub slot, and a slot and a sub slot each include at least one symbol. Here, scheduled physical shared channel mapping types include PDSCH mapping types and PUSCH mapping types, where PDSCH mapping types include PDSCH mapping type A and PDSCH mapping type B, and PUSCH mapping types include PUSCH mapping type A and PUSCH mapping type B.

In order to improve the reliability of data or signaling transmission, one way is repetition transmission. Repetition transmission of M data (e.g., PDSCH or PUSCH) means that the M data carry exactly the same information. For example, the M data come from the same transport block (TB), but have different redundancy versions (RV) after channel coding, or even have the same RV after channel coding, or the M data come from the same RV of the same TB, and only correspond to different layers. RV here refers to different redundant versions obtained after channel coding of transmitted data. In general, a channel version $\{0,1,2,3\}$ can be used. Similarly, repetition transmission of M signalings (such as PDCCH or PUCCH) means that the M signalings carry the same content, for example, M PDCCHs carry the same DCI content (for example, the same value applies to each domain), for example, M PDCCHs carry the same content value. Here, the M data under repetition transmission (such as M PUSCHs or M PDSCHs under repetition transmission) or M signalings under repetition transmission (such as M PUCCHs or M PDCCHs under repetition transmission) may come from M different TRPs, or M different antenna panels, or M different bandwidth parts (BWPs), or M different carrier components (CCs), where the M panels, M BWPs or M CCs may belong to the same TRP, may belong to multiple TRPs, or may come from different transmission slots or sub slots of the same transmission point. Repetition transmission schemes include, but are not limited to, at least one of: Scheme 1 of space division multiplexing, Scheme 2 of frequency division multiplexing, Scheme 3 of intra-slot time division multiplexing, or Scheme 4 of inter-slot time division multiplexing, where Scheme 2 of frequency division multiplexing is further divided into two types according to whether coding RVs of TBs are the same, that is, Scheme2a when the data under repetition transmission correspond to the same RV, and Scheme2b otherwise. M is an integer greater than 1. Any combination of the above multiplexing modes may be adopted, such as a combination of space division multiplexing and frequency division multiplexing, a combination of time division multiplexing and frequency division multiplexing, etc. Here, slot is a set of L1 symbols, and sub slot is a set of K1 symbols. In general, K1 is less than or equal to L1, and L1 can be 14 or 12. K1 is generally a positive integer, such as one from 2 to 13 in the uplink or 2, 4, 6 or 7 in the downlink. Symbols include but are not limited to one of:

orthogonal frequency division multiplexing (OFDM) symbol, single-carrier frequency division multiple access (SC-FDMA) symbol, or orthogonal frequency division multiple access (OFDMA) symbol.

Here, in order to better transmit PUSCH or PDSCH, a group of resource elements (REs) of K1 consecutive symbols and L1 frequency-domain subcarriers are formed into a resource block (RB, sometimes called physical resource block (PRB, or RB)), where K1 and L1 are positive integers, for example, K1=12 or 14, and L1=12. Here, an RE includes a symbol and a smallest resource unit corresponding to a subcarrier for carrying a modulated signal.

Here, physical channels such as PDSCH, PDCCH, PUSCH, and PUCCH are all modulated in a smallest RE, and each RE includes a symbol in the time domain and a subcarrier in the frequency domain. In order to demodulate or acquire information (including data or signals) carried on a physical channel modulated on an RE, it is necessary to estimate a value of a radio channel on the RE, this value is generally estimated by a demodulation reference signal (DMRS), and a channel difference on an RE corresponding to the DMRS is used for obtaining a channel on the physical channel.

In the embodiments listed herein, unless otherwise specified, one terminal device and at least one TRP are provided generally. In order to improve the success rate or reliability of data or signaling transmission, a sender performs N repetition transmissions for data or signals. For example, at least one of PDSCH and PUSCH is transmitted N times. The sender here may be various transmission points in the downlink, such as macro site, micro site, relay and other network-side devices. In the uplink, the sender may be mobile phone, portable device, computer, data card and other terminal devices. A receiver is a terminal device in the downlink and a network-side device in the uplink. The data or signals subjected to N repetition transmissions may come from the same sender, different senders, or different panels of the same or different senders. The data or signals subjected to N repetition transmissions may be transmitted through space division multiplexing, frequency division multiplexing, or time division multiplexing, but alternatively, time division multiplexing.

Higher-layer signaling described herein includes, but is not limited to, radio resource control (RRC) and/or media access control control element (MAC CE).

Herein, after receiving a transmission block, a terminal device or base station feeds back an acknowledgement (ACK) if it is detected that the reception is correct, and feeds back a negative acknowledgement (NACK) otherwise.

In an implementation, FIG. 1 is a flowchart of a data transmission method provided by an embodiment of the present disclosure, which can be applied to repetition transmission of data through a physical shared channel. The method can be executed by a data transmission apparatus provided by an embodiment of the present disclosure, and the apparatus can be implemented by software and/or hardware, and can generally be integrated at a sender. Referring to FIG. 1, the technical scheme of the embodiment of the present disclosure includes the following steps.

At 101, K physical shared channel patterns are acquired.

Figure 2:
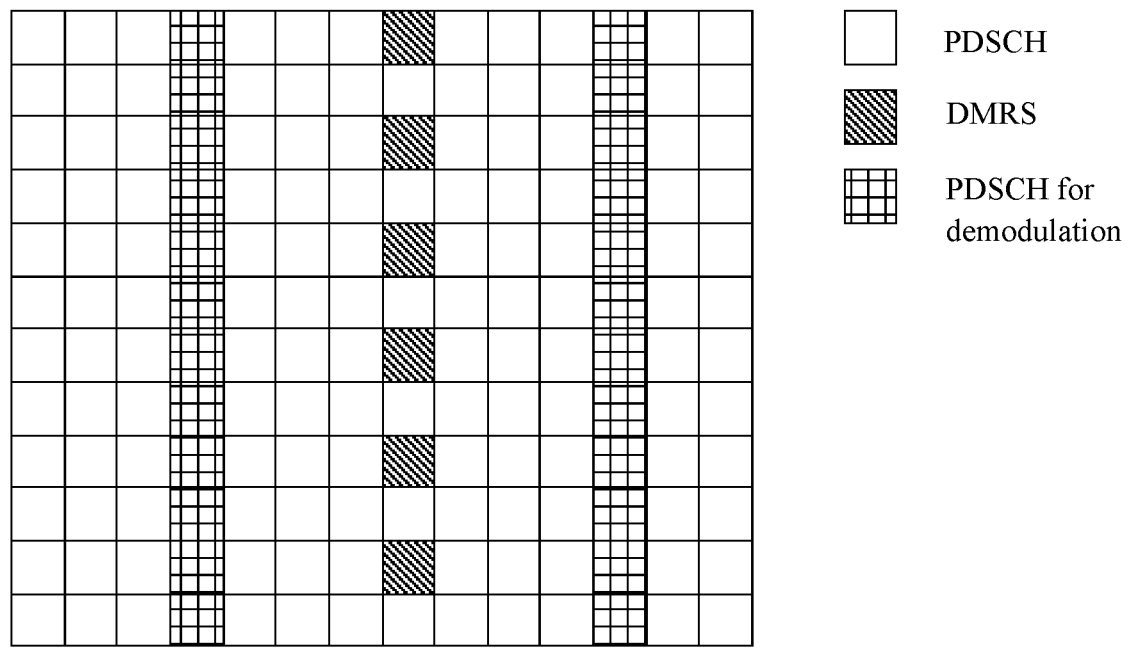
FIG. 2 is an example diagram of a physical shared channel pattern provided by an embodiment of the present disclosure.

The physical shared channel pattern can be a distribution information set of symbols in a physical shared channel, and may include the number and distribution of symbols, for example, a relative index or absolute index of a symbol. The physical shared channel pattern consists of multiple symbol sets, each of which can transmit corresponding data. The physical shared channel pattern can be pre-configured at the sender and a receiver. When the sender is sending data, the receiver can demodulate the sent data according to the physical shared channel pattern of the sent data. FIG. 2 is an example diagram of a physical shared channel pattern provided by an embodiment of the present disclosure. Referring to FIG. 2, the physical shared channel pattern may include a transmission PDSCH, a DMRS and a PDSCH for demodulation, and symbols for transmitting data in a frame in the physical shared channel pattern may be ordered as shown in the figure. The arrangement and number of symbols in different physical shared channel patterns can be different.

The configured physical shared channel pattern can be obtained, and the arrangement of channels for transmitting data can be determined. When the sender performs repetition transmission on data to be transmitted, the physical shared channel patterns used for transmission each time can be different, or one group of repetition transmissions corresponds to the same physical shared channel pattern, but the physical shared channel patterns corresponding to different groups of repetition transmission are different. Here, a group of repetition transmissions includes at least two times of repetition transmission. The physical shared channel is configured with the physical shared channel pattern before data transmission.

At 102, repetition transmission is performed on data to be transmitted according to the K physical shared channel patterns, where K is an integer greater than 1.

In the embodiments of the present disclosure, when repetition transmission is performed on the data to be transmitted, the used physical shared channels can be arranged according to the physical shared channel pattern, where when repetition transmission is performed on the data to be transmitted, the data to be transmitted may be the same information during repetition transmission. According to different transmission scenarios, the data to be transmitted may have the same RV or different RVs during repetition transmission. Each time repetition transmission is performed on the data to be transmitted, the data to be transmitted may come from different TRPs or different antenna panels, may have different BWPs, and may have different carrier components. When repetition transmission is performed on the data to be transmitted according to the physical shared channel pattern, repetition transmission schemes may include at least one of: a transmission mode of space division multiplexing, a transmission mode of frequency division multiplexing, a transmission mode of intra-slot time division multiplexing, a transmission mode of inter-slot time division multiplexing, etc. The sender can perform repetition transmission on the data to be transmitted according to the physical shared channel pattern. The transmission mode and the physical shared channel pattern used in each time of repetition transmission may vary. Alternatively, one group of repetition transmissions corresponds to the same physical shared channel pattern, but the physical shared channel patterns corresponding to different groups of repetition transmission are different.

According to the technical scheme of the embodiments of the present disclosure, repetition transmission is performed on the data to be transmitted through the configured physical shared channel patterns, so that high-reliability data transmission is realized, and resource occupation in repetition transmission is reduced.

On the basis of the above embodiment of the present disclosure, the K physical shared channel patterns include at least two types of physical shared channel patterns.

When the sender is a base station, the physical shared channel pattern can be sent to a terminal device through a higher-layer signaling and/or a physical layer signaling.

In the embodiments of the present disclosure, there may be multiple physical shared channel patterns which may be different. The number and distribution of symbols included in a third symbol set and/or the number and distribution of symbols included in a first symbol set may vary in different physical shared channel patterns.

On the basis of the above embodiment of the present disclosure, each of the K physical shared channel patterns at least includes a first symbol set, a second symbol set and a third symbol set, where the first symbol set and the second symbol set are configured to transmit data; and the third symbol set is configured to transmit a DMRS, and in some cases, some subcarriers in the third symbol set can also be configured to transmit data.

The physical shared channel pattern may consist of a first symbol set, a second symbol set and a third symbol set, where symbols in each symbol set may be orthogonal frequency division multiple access (OFDM) symbols, single-carrier frequency division multiple access (SC-FDMA) symbols, orthogonal frequency division multiple access (OFDMA) symbols, etc. The physical shared channel pattern may include a first symbol set and a second symbol set for transmitting data, and a third symbol set for transmitting a DMRS. The DMRS included in the third symbol set can be configured to estimate channel information corresponding to the first symbol set and the second symbol set, and the first symbol set and the third symbol set can be configured together to estimate channel information corresponding to the second symbol set.

Figure 3:
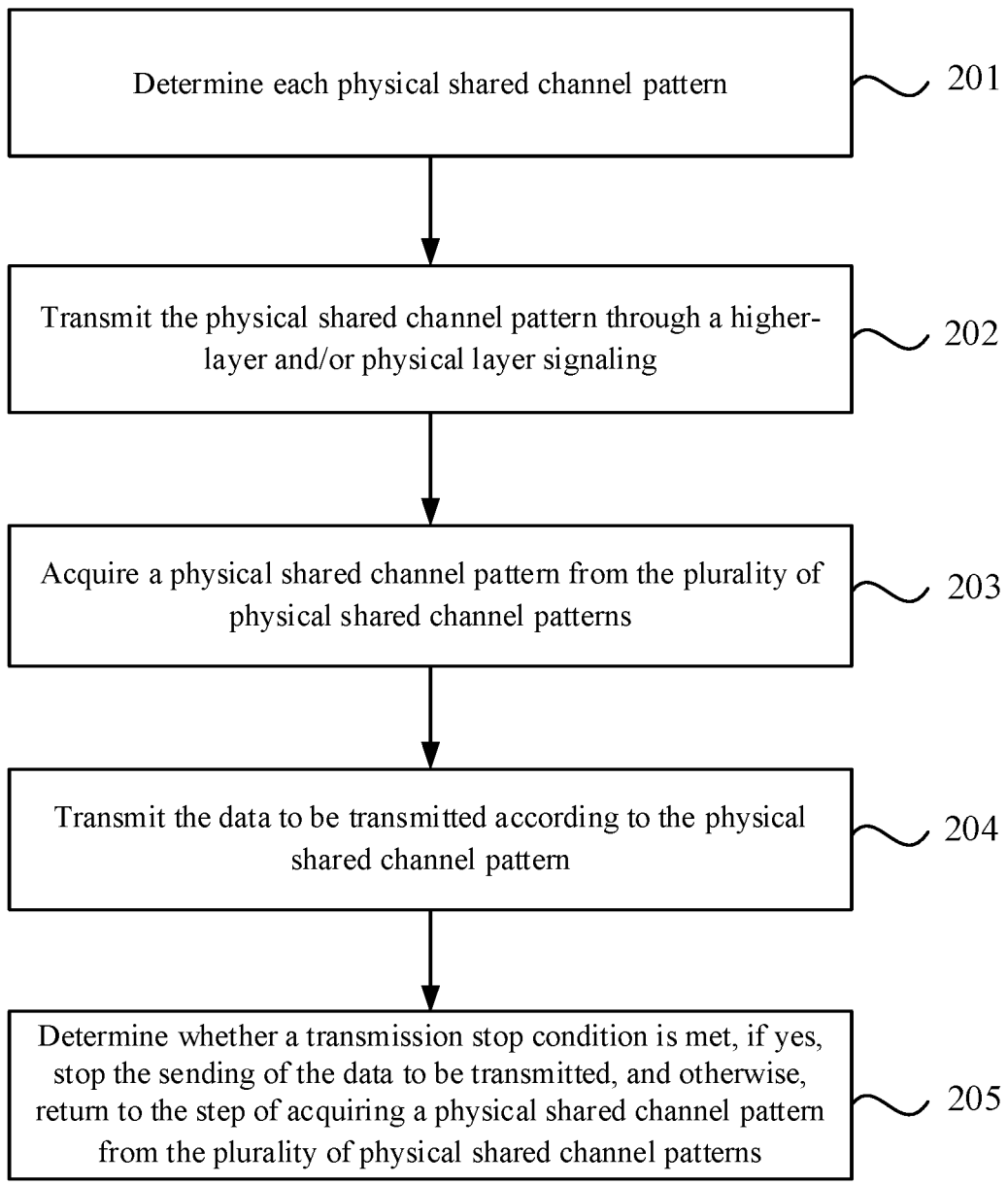
FIG. 3 is a flowchart of a data transmission method provided by an embodiment of the present disclosure.

FIG. 3 is a flowchart of a data transmission method provided by an embodiment of the present disclosure, which is based on the above embodiment. Referring to FIG. 3, the method according to the embodiment of the present disclosure includes the following steps.

At 201, each physical shared channel pattern is determined.

In the embodiments of the present disclosure, symbol sets of each physical shared channel pattern can also be determined to determine a physical shared channel for transmitting data. The physical shared channel pattern may consist of symbol sets, and the number and distribution of symbols in each symbol set in each physical shared channel can be determined in advance. For example, the physical shared channel pattern may consist of a first symbol set, a second symbol set and a third symbol set, where the first symbol set and the second symbol set can transmit data, and the third symbol set can transmit the DMRS. In the physical shared channel pattern, channel information of the first symbol set can be determined according to channel information of the third symbol set, and channel information of the second symbol set can be determined according to the channel information of the first symbol set and the channel information of the third symbol set.

At 202, the physical shared channel pattern is transmitted through a higher-layer and/or physical layer signaling.

Before data transmission with the receiver, the physical shared channel pattern needs to be configured and transmitted, so that the receiver and the sender use the same physical shared channel pattern for data transmission. When the sender is a variety of network-side devices (such as various types of base stations), the physical shared channel pattern can be sent to the terminal device through a higher-layer signaling or physical signaling to realize the configuration of the physical shared channel pattern. The physical shared channel pattern may be configured at the sender and the receiver in advance, or before data transmission, the physical shared channel pattern can be configured according to the data transmission situation and transmitted to the receiver.

Exemplarily, the base station configures K sets of PDSCH patterns through the higher-layer signaling, and the K sets of PDSCH patterns are used for N repetition transmissions of the PDSCH. Alternatively, one set of PDSCH patterns is configured, and the other K−1 sets are pre-configured according to the first set of PDSCH patterns and an agreement between the base station and the terminal device. Alternatively, the K sets of PDSCH patterns are all pre-configured according to the agreement between the base station and the terminal device. Here, the pre-configured PDSCH pattern does not need to be sent to the terminal device by the base station through a signaling, but configuration information of the configured PDSCH pattern needs to be sent by the base station to the terminal device through a signaling, where the signaling here includes a higher-layer signaling and/or a physical layer signaling. Similarly, the PDSCH here can be replaced by a PUSCH.

At 203, a physical shared channel pattern is acquired from the plurality of physical shared channel patterns.

During repetition transmission of the data to be transmitted, one physical shared channel pattern for data transmission can be selected from the plurality of physical shared channel patterns, for example, according to indexes of the physical shared channel patterns, from small to large. The selection is also related to the number of times of repetition transmission, for example, an $i^{th}$ shared channel pattern corresponds to an $i^{th}$ group of repetition transmission, where i=1, . . . , K, K is the number of the physical shared channel patterns, and the $i^{th}$ group of repetition transmissions includes at least one time of repetition transmission. Which repetition transmission is included in each group of repetition transmissions can be determined according to at least one of: a higher-layer configuration or an agreement between the sender and the receiver. For example, odd-numbered repetition transmission is grouped. Alternatively, K1 consecutive times of repetition transmission are grouped, where K1 is an integer greater than 1, for example, K1=N/2.

In order to improve data transmission efficiency, with the increase of the number of times of repetition transmission, a physical shared channel pattern with a larger number of symbols included in the first symbol set among the physical shared channel patterns can be acquired first, so as to improve data transmission efficiency.

At 204, the data to be transmitted are transmitted according to the physical shared channel pattern.

A physical shared channel can be established according to the physical shared channel patterns, and the data to be transmitted can be transmitted from the sender to the receiver through the physical shared channel.

In an implementation, the physical shared channel includes at least one of: a PUSCH or a PDSCH.

In the embodiments of the present disclosure, the physical shared channel for data transmission may include a PUSCH and a PDSCH.

The above K reference signal parameters can be used for N repetition transmissions of the physical channel, where K and N are integers greater than 1, and N is greater than or equal to K. The above N repetition transmissions can be divided into K groups, and each group of repetition transmissions uses the same physical shared channel pattern, such as n1 or n1−1 or n1+1 times of repetition transmission with consecutive slot indexes corresponding to repetition transmission, where n1 is a positive integer, for example, n1=f(N/K), where f means rounding up or down a real number, and N/K means dividing N by K. If N cannot be divided by K with no remainder, then some repetition transmission groups may include n1−1 times of repetition transmission when f is rounded up, and some repetition transmission groups may include n1+1 times of repetition transmission when f is rounded down. Here, an $i^{th}$ group of repetition transmissions corresponds to an $i^{th}$ physical shared channel pattern, that is, the $i^{th}$ physical shared channel pattern is used for all repetition transmission in the ith group of repetition transmission, where i=1, . . . , K.

At 205, it is determined whether a transmission stop condition is met, if yes, the sending of the data to be transmitted is stopped, and otherwise, the method returns to the step of acquiring a physical shared channel pattern from the plurality of physical shared channel patterns.

The transmission stop condition can be a condition for stopping the repetition transmission of the data to be transmitted, and in response to the sender meeting the transmission stop condition, the sender can stop sending the data to be transmitted to the receiver.

After sending the data to be transmitted, the sender can determine whether the transmission stop condition is met. In response to the transmission stop condition being met, the sender can stop the repetition transmission of the data to be transmitted. In response to the transmission stop condition being not met, the sender can acquire a new physical shared channel pattern from the plurality of physical shared channel patterns and retransmit the data to be transmitted according to the new physical shared channel pattern.

On the basis of the above embodiment of the present disclosure, the transmission stop condition includes at least one of: the number of times of sending the data to be transmitted being greater than or equal to a repetition transmission threshold; or a reception success signal fed back by the receiver being acquired.

The condition that the sender stops the repetition transmission of the data to be transmitted may be that the number of times of repetition transmission of the data to be transmitted is greater than or equal to the repetition transmission threshold, where the repetition transmission threshold can be a maximum number of times of transmission of the data to be transmitted, which can be determined according to the performance of the sender. The repetition transmission threshold can be smaller than the number of types of the physical shared channel patterns, and each time of repetition transmission of the data to be transmitted may use a different physical shared channel pattern. The condition that the sender stops the repetition transmission of the data to be transmitted may also be that the reception success signal from the receiver is received. The receiver can feed back the reception success signal to the sender after successfully demodulating the data to be transmitted. The sender can confirm the success of transmission of the data to be transmitted by receiving the reception success signal, and can stop sending the data to be transmitted to the receiver.

According to the technical scheme of the embodiment of the present disclosure, the physical shared channel pattern is determined and sent through the higher-layer and/or physical layer signaling; during repetition transmission of the data to be transmitted, the physical shared channel pattern is acquired according to the pre-configured K physical shared channel patterns, and the data to be transmitted are sent according to the physical shared channel pattern; in response to the transmission stop condition being met, the repetition transmission of the data to be transmitted is stopped; and otherwise, the data to be transmitted are sent again according to the physical shared channel pattern. High-reliability data transmission is realized, and resource occupation during repetition transmission is reduced.

On the basis of the above embodiment of the present disclosure, determining the physical shared channel pattern includes: determining the number of symbols and symbol index values in a first symbol set; determining the number of symbols and symbol index values in a second symbol set; and determining the number of symbols and symbol index values in a third symbol set.

Figure 4:
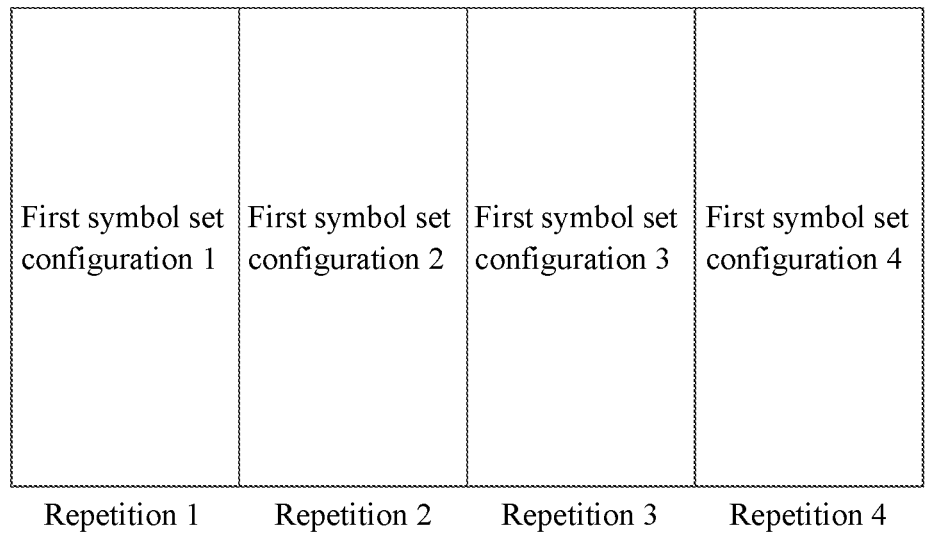
FIG. 4 is an example configuration diagram of a physical shared channel pattern provided by an embodiment of the present disclosure.

The symbol index value can be a value range of each symbol, and can also be starting and ending positions of the symbol for transmitting the data. For example, a PDSCH type includes a PDSCH mapping type A and a PDSCH mapping type B, where a resource scheduled by the PDSCH mapping type A includes 3 or more symbols, and the starting position of the scheduled resource is the symbol index 0-3, while a resource scheduled by the PDSCH mapping type B includes 2, 4, 6 and 7 symbols, and the starting position of the scheduled resource is the symbol index 0-12. In the embodiments of the present disclosure, determining a physical shared channel pattern may include: determining the number of symbols and symbol index values in symbol sets constituting the physical shared channel pattern. The number of symbols and symbol index values in the first symbol set and the second symbol set for transmitting data may be determined, and the number of DMRSs and symbol index values for transmitting the DMRSs may be determined. The symbols in the symbol sets in different physical shared channel patterns may be different. FIG. 4 is an example configuration diagram of a physical shared channel pattern provided by an embodiment of the present disclosure. Referring to FIG. 4, a plurality of first symbol sets may be configured in the physical shared channel pattern. During repetition transmission of data, the configurations of the first symbol set and/or the third symbol set used in different repetition transmission cycles may be different.

On the basis of the above embodiment of the present disclosure, the number of symbols and symbol index values in the first symbol set and/or the third symbol set are determined based on at least one of: type of cyclic prefix, number of consecutive DMRS symbols, total number of DMRSs, number of enhanced DMRSs, frequency hopping of DMRSs, mapping type of physical shared channel, number of scheduled symbols of physical shared channel, higher-layer signaling configuration or pre-configuration. Here, when the number of consecutive DMRS symbols is 1, it is called single-symbol DMRS, and when the number of consecutive DMRS symbols is 2, it is called double-symbol DMRS.

When configuring the physical shared channel pattern, the number of symbols and the corresponding symbol values in the first symbol set and/or the third symbol set can be determined by the type of cyclic prefix, or the symbol values and the number of symbols in the first symbol set and/or the third symbol set in the physical shared channel pattern can be determined by the number of enhanced DMRS, frequency hopping of DMRSs, mapping type of the physical shared channel, the number of scheduled symbols of the physical shared channel, the higher-layer signaling configuration and the pre-configuration. Since the total number of symbols in a slot is determined, the number of symbols and values of the second symbol set can be indirectly determined. Assuming that the number in the first symbol set is k1 and the number in the third symbol set is k2, their sum M and the index can be illustrated by at least one of the following examples. Here, the number of symbols in the third symbol set k2 and the corresponding index can be obtained through the higher-layer signaling and/or the physical layer signaling. Here, k1 and k2 are integers greater than or equal to 0, and M=k1+k2 is a positive integer, which is less than the number of scheduled symbols $l_d$ of the physical shared channel. The number of scheduled symbols $l_d$ of the physical shared channel refers to the sum of symbols used for transmitting data, including the above first symbol set, second symbol set and third symbol set.

Example 1

For the PDSCH, when the number of consecutive DMRSs is 1, the symbol values in the first symbol set and/or the third symbol set are shown in Table 1 below:

TABLE 1

| Number of scheduled symbols $l_d$ of the physical shared channel | Symbol values in first symbol set and/or third symbol set | | | | | | | |
|---|---|---|---|---|---|---|---|---|
| | PDSCH mapping type A dmrs-AdditionalPosition | | | | PDSCH mapping type B dmrs-AdditionalPosition | | | |
| | 0 | 1 | 2 | 3 | 0 | 1 | 2 | 3 |
| 2 | — | — | — | — | $l_0$ | $l_0$ | | |
| 3 | $l_0$ | $l_0$ | $l_0$ | $l_0$ | — | — | | |
| 4 | $l_0$ | $l_0$ | $l_0$ | $l_0$ | $l_0$ | $l_0$ | | |
| 5 | $l_0$ | $l_0$ | $l_0$ | $l_0$ | — | — | | |
| 6 | $l_0$ | $l_0$ | $l_0$ | $l_0$ | $l_0$ | $l_{0,4}$ | | |
| 7 | $l_0$ | $l_0$ | $l_0$ | $l_0$ | $l_0$ | $l_{0,4}$ | | |
| 8 | $l_0$ | $l_{0,7}$ | $l_{0,7}$ | $l_{0,7}$ | — | — | | |
| 9 | $l_0$ | $l_{0,7}$ | $l_{0,7}$ | $l_{0,7}$ | — | — | | |
| 10 | $l_0$ | $l_{0,9}$ | $l_{0,6,9}$ | $l_{0,6,9}$ | — | — | | |
| 11 | $l_0$ | $l_{0,9}$ | $l_{0,6,9}$ | $l_{0,6,9}$ | — | — | | |
| 12 | $l_0$ | $l_{0,9}$ | $l_{0,6,9}$ | $l_{0,5,8,11}$ | — | — | | |
| 13 | $l_0$ | $l_{0,l_1}$ | $l_{0,7,11}$ | $l_{0,5,8,11}$ | — | — | | |
| 14 | $l_0$ | $l_{0,l_1}$ | $l_{0,7,11}$ | $l_{0,5,8,11}$ | — | — | | |

Example 2

For the PDSCH, when the number of consecutive DMRSs is 2, the symbol values in the first symbol set and/or the third symbol set are shown in Table 2 below:

TABLE 2

| Number of scheduled symbols $l_d$ of the physical shared channel | Symbol values in first symbol set and/or third symbol set | | | | | |
|---|---|---|---|---|---|---|
| | PDSCH mapping type A dmrs-AdditionalPosition | | | PDSCH mapping type B dmrs-AdditionalPosition | | |
| | 0 | 1 | 2 | 0 | 1 | 2 |
| <4 | | | | — | — | |
| 4 | $l_0$ | $l_0$ | | — | — | |
| 5 | $l_0$ | $l_0$ | | — | — | |
| 6 | $l_0$ | $l_0$ | | $l_0$ | $l_0$ | |
| 7 | $l_0$ | $l_0$ | | $l_0$ | $l_0$ | |
| 8 | $l_0$ | $l_0$ | | — | — | |
| 9 | $l_0$ | $l_0$ | | — | — | |
| 10 | $l_0$ | $l_{0,8}$ | | — | — | |
| 11 | $l_0$ | $l_{0,8}$ | | — | — | |
| 12 | $l_0$ | $l_{0,8}$ | | — | — | |
| 13 | $l_0$ | $l_{0,10}$ | | — | — | |
| 14 | $l_0$ | $l_{0,10}$ | | — | — | |

Example 3

For the PUSCH, when the number of consecutive DMRS is 1 and no frequency hopping exists, the symbol values in the first symbol set and/or the third symbol set are shown in the following table 3:

TABLE 3

| Number of scheduled symbols $l_d$ of the physical shared channel | Symbol values in first symbol set and/or third symbol set | | | | | | | |
|---|---|---|---|---|---|---|---|---|
| | PUSCH mapping type A dmrs-AdditionalPosition | | | | PUSCH mapping type B dmrs-AdditionalPosition | | | |
| | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_{0,4}$ | $l_{0,4}$ | $l_{0,4}$ |
| 6 | $l_0$ | $l_0$ | $l_0$ | $l_0$ | $l_0$ | $l_{0,4}$ | $l_{0,4}$ | $l_{0,4}$ |
| 7 | $l_0$ | $l_0$ | $l_0$ | $l_0$ | $l_0$ | $l_{0,4}$ | $l_{0,4}$ | $l_{0,4}$ |
| 8 | $l_0$ | $l_{0,7}$ | $l_{0,7}$ | $l_{0,7}$ | $l_0$ | $l_{0,6}$ | $l_{0,3,6}$ | $l_{0,3,6}$ |
| 9 | $l_0$ | $l_{0,7}$ | $l_{0,7}$ | $l_{0,7}$ | $l_0$ | $l_{0,6}$ | $l_{0,3,6}$ | $l_{0,3,6}$ |
| 10 | $l_0$ | $l_{0,9}$ | $l_{0,6,9}$ | $l_{0,6,9}$ | $l_0$ | $l_{0,8}$ | $l_{0,4,8}$ | $l_{0,3,6,9}$ |
| 11 | $l_0$ | $l_{0,9}$ | $l_{0,6,9}$ | $l_{0,6,9}$ | $l_0$ | $l_{0,8}$ | $l_{0,4,8}$ | $l_{0,3,6,9}$ |
| 12 | $l_0$ | $l_{0,9}$ | $l_{0,6,9}$ | $l_{0,5,8,11}$ | $l_0$ | $l_{0,10}$ | $l_{0,5,10}$ | $l_{0,3,6,9}$ |
| 13 | $l_0$ | $l_{0,11}$ | $l_{0,7,11}$ | $l_{0,5,8,11}$ | $l_0$ | $l_{0,10}$ | $l_{0,5,10}$ | $l_{0,3,6,9}$ |
| 14 | $l_0$ | $l_{0,11}$ | $l_{0,7,11}$ | $l_{0,5,8,11}$ | $l_0$ | $l_{0,10}$ | $l_{0,5,10}$ | $l_{0,3,6,9}$ |

Example 4

For the PUSCH, when the number of consecutive DMRS is 2 and no frequency hopping exists, the symbol values in the first symbol set and/or the third symbol set are shown in the following table 4:

TABLE 4

| Number of scheduled symbols $l_d$ of the physical shared channel | Symbol values in first symbol set and/or third symbol set | | | | | | | |
|---|---|---|---|---|---|---|---|---|
| | PUSCH mapping type A dmrs-AdditionalPosition | | | | PUSCH mapping type B dmrs-AdditionalPosition | | | |
| | 0 | 1 | 2 | 3 | 0 | 1 | 2 | 3 |
| <4 | — | — | | | — | — | | |
| 4 | $l_0$ | $l_0$ | | | — | — | | |

TABLE 4-continued

| Number of scheduled symbols $l_d$ of the physical shared channel | Symbol values in first symbol set and/or third symbol set | | | | | | | |
|---|---|---|---|---|---|---|---|---|
| | PUSCH mapping type A dmrs-AdditionalPosition | | | | PUSCH mapping type B dmrs-AdditionalPosition | | | |
| | 0 | 1 | 2 | 3 | 0 | 1 | 2 | 3 |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_{0,5}$ | | |
| 9 | $l_0$ | $l_0$ | | | $l_0$ | $l_{0,5}$ | | |
| 10 | $l_0$ | $l_{0,8}$ | | | $l_0$ | $l_{0,7}$ | | |
| 11 | $l_0$ | $l_{0,8}$ | | | $l_0$ | $l_{0,7}$ | | |
| 12 | $l_0$ | $l_{0,8}$ | | | $l_0$ | $l_{0,9}$ | | |
| 13 | $l_0$ | $l_{0,10}$ | | | $l_0$ | $l_{0,9}$ | | |
| 14 | $l_0$ | $l_{0,10}$ | | | $l_0$ | $l_{0,9}$ | | |

Example 5

For the PUSCH, when the number of consecutive DMRS is 1 and frequency hopping exists, the symbol values in the first symbol set and/or the third symbol set are shown in the following table 5:

TABLE 5

| Number of scheduled symbols $l_d$ of the physical shared channel | Symbol values in first symbol set and/or third symbol set | | | | | | | | | | | |
|---|---|---|---|---|---|---|---|---|---|---|---|---|
| | PUSCH mapping type A | | | | | | | | PUSCH mapping type B | | | |
| | $l_0 = 2$ dmrs-AdditionalPosition | | | | $l_0 = 3$ dmrs-AdditionalPosition | | | | $l_0 = 0$ dmrs-AdditionalPosition | | | |
| | 0 | | 1 | | 0 | | 1 | | 0 | | 1 | |
| | 1st hop | 2nd hop | 1st hop | 2nd hop | 1st hop | 2nd hop | 1st hop | 2nd hop | 1st hop | 2nd hop | 1st hop | 2nd hop |
| ≤3 | — | — | — | — | — | — | — | — | 0 | 0 | 0 | 0 |
| 4 | 2 | 0 | 2 | 0 | 3 | 0 | 3 | 0 | 0 | 0 | 0 | 0 |
| 5, 6 | 2 | 0 | 2 | 0, 4 | 3 | 0 | 3 | 0, 4 | 0 | 0 | 0, 4 | 0, 4 |
| 7 | 2 | 0 | 2, 6 | 0, 4 | 3 | 0 | 3 | 0, 4 | 0 | 0 | 0, 4 | 0, 4 |

In Examples 1-5, the number of symbols in the first symbol set and/or the third symbol set is determined by the number of values (indexes, or symbol positions) of the symbols in the first symbol set and/or the third symbol set in the tables, where only the value of the first symbol set can be included, that is, the number of the third symbol set is 0; in addition, if k2 is not equal to 0, the symbol value of the third symbol set is configured by the higher-layer and/or physical layer signaling. In the tables, $l_0$ represents a starting position of the physical shared channel, which, for example, is 3 or 4 in physical shared channel type A and 0 in physical shared channel type B.

On the basis of the above embodiment of the present disclosure, transmitting the data to be transmitted according to the physical shared channel pattern to the receiver through the physical shared channel includes: determining whether the first symbol set in the physical shared channel pattern is an empty set with discrimination information, and if yes, only transmitting the second symbol set and the third symbol set.

In an embodiment, the first symbol set in the shared channel pattern is not an empty set, that is, the number of symbols in the first symbol set is greater than or equal to one.

In response to determining that the first symbol set is not empty, the data to be transmitted can be sent to the receiver through the physical shared channel corresponding to the first symbol set and the second symbol set. In response to the first symbol set being an empty set, the physical shared channel corresponding to the first symbol set is not used for data transmission, and data can be transmitted according to the second symbol set and the third symbol set in the physical shared channel pattern.

On the basis of the above embodiment of the present disclosure, the discrimination information includes at least one of: the higher-layer signaling, the physical layer signaling, the number of power control parameters included in the physical shared channel, or the number of modulation and coding mode parameters included in the physical shared channel.

Whether there are symbols in the first symbol set can be determined by the higher-layer signaling, the physical layer signaling, the number of power control parameters included in the physical shared channel and/or the number of modulation and coding mode parameters included in the physical shared channel. For example, when the number of power control parameters is 1 and/or the number of modulation and coding mode parameters included in the physical shared channel is 1, the first symbol set is empty, otherwise, the number in the first symbol set is greater than or equal to 1.

On the basis of the above embodiment of the present disclosure, when repetition transmission is performed on the data to be transmitted according to the K physical shared channel patterns, a modulation and coding scheme order of data corresponding to the first symbol set in the physical shared channel pattern is smaller than that of data corresponding to the second symbol set.

In an implementation, the modulation and coding scheme order of the data corresponding to the first symbol set is smaller than that of the data corresponding to the second symbol set.

On the basis of the above embodiment of the present disclosure, when repetition transmission is performed on the data to be transmitted according to the K physical shared channel patterns, transmission power of the data corresponding to the first symbol set in the physical shared channel pattern is greater than that of the data corresponding to the second symbol set.

The transmission power of the data corresponding to the first symbol set is greater than that of the data corresponding to the second symbol set.

On the basis of the above embodiment of the present disclosure, when repetition transmission is performed on the data to be transmitted according to the K physical shared channel patterns, the first symbol set meets at least one of the following requirements during transmission: with the increase of the number of times of transmission of the data to be transmitted, the number of pilots used for demodulation in the first symbol set gradually increases; with the increase of the number of times of transmission of the data to be transmitted, the number of symbols in the first symbol set gradually increases; or with the increase of the number of times of transmission of the data to be transmitted, the transmission power of the symbols in the first symbol set gradually increases.

The number of REs used for demodulation in the first symbol set corresponding to a $j^{th}$ time of repetition transmission is greater than that in the first symbol set corresponding to an $i^{th}$ time of repetition transmission; the number of symbols in the first symbol set corresponding to the $j^{th}$ time of repetition transmission is greater than that in the first symbol set corresponding to the $i^{th}$ time of repetition transmission; and the transmission power of the symbols of the first symbol set corresponding to the $j^{th}$ time of repetition transmission is greater than that of the symbols of the first symbol set corresponding to the $i^{th}$ time of repetition transmission; where $1<=i<j<=N$.

Figure 5:
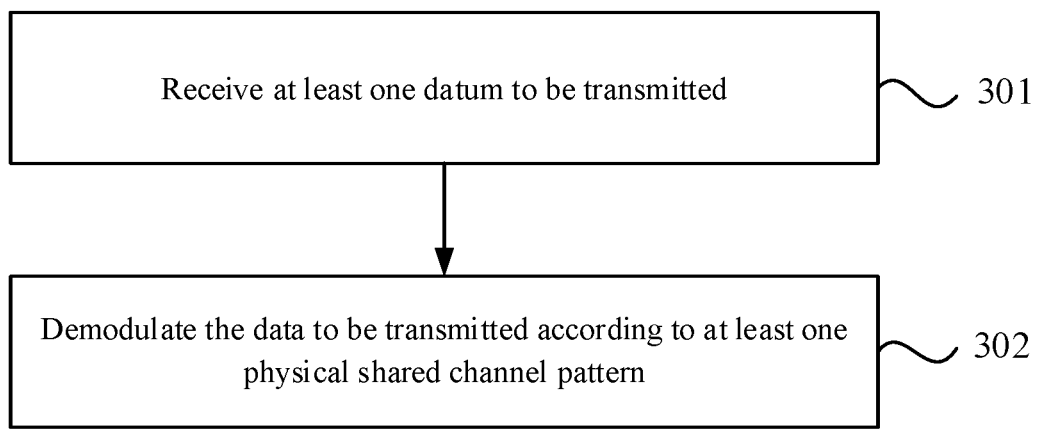
FIG. 5 is a flowchart of a data transmission method provided by an embodiment of the present disclosure.

FIG. 5 is a flowchart of a data transmission method provided by an embodiment of the present disclosure, which can be applied to repetition transmission of data to ensure data availability. The method can be executed by a data transmission apparatus provided by an embodiment of the present disclosure, and the apparatus can be implemented by software and/or hardware, and can generally be integrated at a receiver. The method of the embodiment of the present disclosure includes the following steps.

At 301, at least one datum to be transmitted is received.

Data to be transmitted sent by a sender through a physical shared channel can be received, the data to be transmitted can include at least one time of repetition transmission, and the physical shared channel on which the one time of repetition transmission depends can be associated with a pre-configured physical shared channel pattern.

At 302, the datum to be transmitted is demodulated according to at least one physical shared channel pattern.

In the embodiments of the present disclosure, the DMRS corresponding to the data to be transmitted can be determined by the physical shared channel pattern, and the received data to be transmitted can be demodulated by the DMRS to obtain required data content.

According to the technical scheme of the embodiment of the present disclosure, by receiving the repetition transmission of the at least one datum to be transmitted and demodulating the data to be transmitted through the physical shared channel pattern, high-reliability data transmission is realized, and resource occupation in repetition transmission is reduced.

Figure 6:
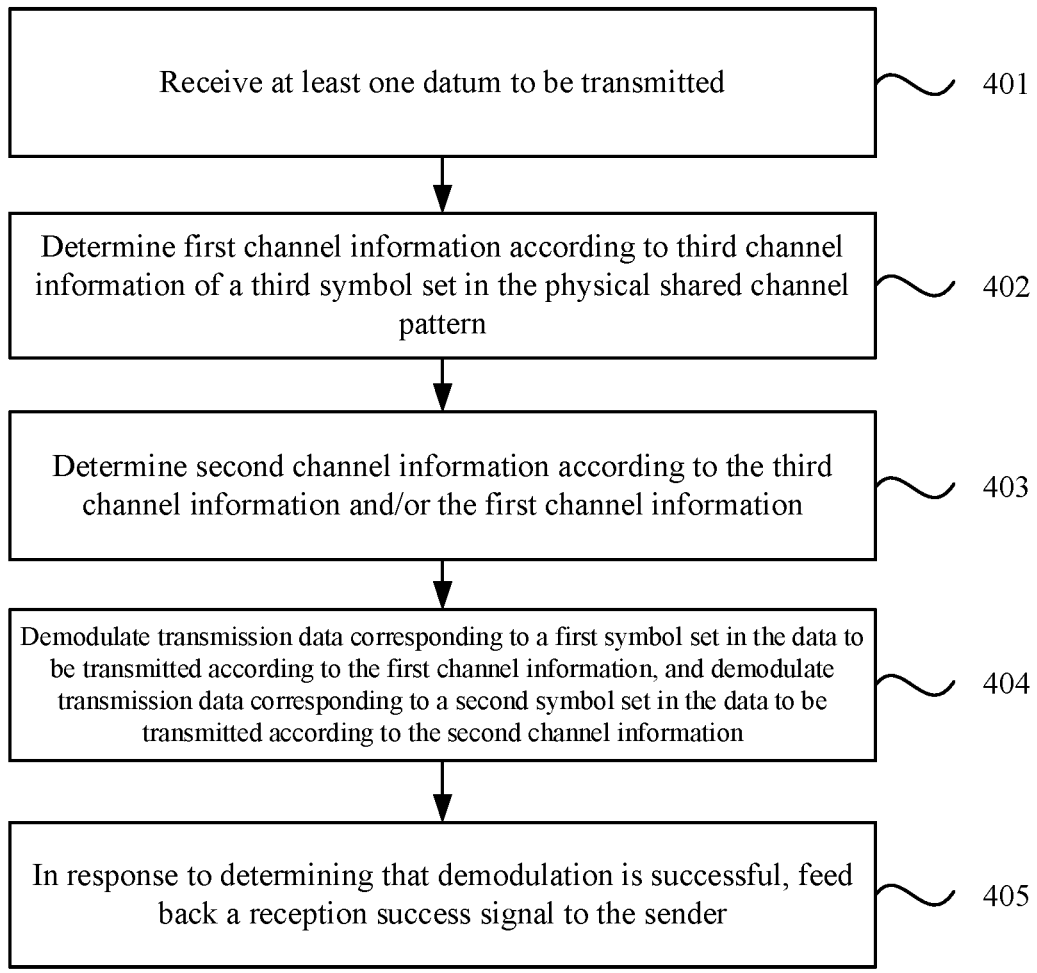
FIG. 6 is a flowchart of a data transmission method provided by an embodiment of the present disclosure.

FIG. 6 is a flowchart of a data transmission method provided by an embodiment of the present disclosure, which is based on the above embodiment. Referring to FIG. 6, the data transmission method according to the embodiment of the present disclosure includes the following steps.

At 401, at least one datum to be transmitted is received.

At 402, first channel information is determined according to third channel information of a third symbol set in the physical shared channel pattern.

The third symbol set in the shared channel pattern is configured to transmit the DMRS. The third channel information corresponding to the transmission of the DMRS can be determined according to the third symbol set, and the first channel information in the data to be transmitted can be analyzed according to the third channel information. For example, the received DMRS of the third symbol set can be used for estimating the corresponding channel information H3, and the channel information H1 corresponding to the first symbol set can be estimated according to the channel information H3 corresponding to the third symbol set.

At 403, second channel information is determined according to the third channel information and/or the first channel information.

In the embodiments of the present disclosure, the second channel information corresponding to the second symbol set can be estimated according to the third channel information and the first channel information. For example, corresponding transmission data on the first symbol set are demodulated according to the first channel information H1, and then corresponding first channel information H1' is estimated again according to the corresponding transmission data on the first symbol set as a pilot and received data on the first symbol set, so that the RE on the first symbol set also plays the role of the DMRS. The second channel information H2 on the second symbol set is estimated by interpolation (such as linear or nonlinear interpolation) according to the first channel information H1' and the third channel information H3.

At 404, transmission data corresponding to the first symbol set in the data to be transmitted are demodulated according to the first channel information, and transmission data corresponding to the second symbol set in the data to be transmitted are demodulated according to the second channel information.

The data to be transmitted sent by the first symbol set can be received according to the acquired first channel information, and the data to be transmitted sent by the second symbol set can be received according to the second channel information.

At 405, in response to determining that demodulation is successful, a reception success signal is fed back.

In response to the receiver successfully demodulating the received data to be transmitted, the receiver successfully receiving the data to be transmitted can be manifested, and the reception success signal can be fed back to the sender to make the sender stop the repetition transmission of the data to be transmitted.

According to the technical scheme of the embodiment of the present disclosure, by receiving the data to be transmitted sent by the sender and demodulating the data to be transmitted through the physical shared channel pattern, high-reliability data transmission is realized, and resource occupation in repetition transmission is reduced.

On the basis of the above embodiment of the present disclosure, the modulation and coding scheme order of the transmission data corresponding to the first symbol set is smaller than that of the second symbol set.

The larger the MCS in the symbol set, the larger or higher the corresponding modulation and coding scheme order. In the embodiment of the present disclosure, the MCS of the transmission data corresponding to the first symbol set is smaller than that of the second symbol set, so the modulation and coding scheme order of the transmission data corresponding to the first symbol set is smaller than that of the second symbol set.

On the basis of the above embodiment of the present disclosure, the transmission power of the transmission data corresponding to the first symbol set is greater than that of the second symbol set.

In an implementation, taking PDSCH repetition transmission as an example, a transmission point such as a base station can configure N repetition transmissions through the higher-layer signaling and/or the physical layer signaling, where N is an integer greater than or equal to 2. The N repetition transmissions can be performed by one base station in different slots or sub slots, or by multiple base stations in different slots or sub slots through time division multiplexing, or by multiple panels of at least one base station in different slots or sub slots through time division multiplexing. The N repetition transmissions can also be performed by at least one panel of at least one base station through space division multiplexing or frequency division multiplexing. The base station configures K sets of PDSCH patterns through the higher-layer signaling, and the K sets of PDSCH patterns are used for N repetition transmissions of the PDSCH. Alternatively, one set of PDSCH patterns is configured, and the other K−1 sets are pre-configured according to the first set of PDSCH patterns and an agreement between the base station and the terminal device. Alternatively, the K sets of PDSCH patterns are all pre-configured according to the agreement between the base station and the terminal device. Here, the pre-configured PDSCH pattern does not need to be sent to the terminal device by the base station through a signaling, but configuration information of the configured PDSCH pattern needs to be sent by the base station to the terminal device through a signaling, where the signaling here includes a higher-layer signaling and/or a physical layer signaling. The physical shared channel pattern includes a first symbol set, a second symbol set, and a third symbol set, where the first symbol set and the second symbol set are configured to transmit PDSCH, and the third symbol set is configured to transmit DMRS. K is an integer greater than 1, N is an integer greater than 1, and N is greater than or equal to K. The terminal device obtains the K sets of PDSCH patterns by receiving the signaling sent by the base station or by pre-configuration.

The number of symbols in the first symbol set is not null, that is, greater than or equal to one. The base station transmits PDSCH1 with the RE on the first symbol set, but MCS is agreed by the base station and the terminal device, such as quadrature phase shift keying (QPSK) and binary phase shift keying (BPSK). The base station transmits PDSCH2 with the RE on the second symbol set, and the third symbol set is configured to transmit DMRS. The terminal device receives PDSCH1 on the first symbol set, PDSCH2 on the second symbol set, and DMRS on the third symbol set. In this way, the terminal device can estimate the corresponding channel information H3 using the received DMRS of the third symbol set, estimate the channel information H1 corresponding to the first symbol set according to the channel information H3 corresponding to the third symbol set, demodulate the corresponding transmission data on the first symbol set according to H1, and then estimate the corresponding channel H1' again according to the corresponding data on the first symbol set as a pilot and the received data on the first symbol set. Therefore, the RE on the first symbol set also plays the role of the DMRS, and estimates the channel information H2 on the second symbol set by interpolation (such as linear interpolation) according to H1' and H3. Here, H1, H1', H2, and H3 are all Nr*Nt complex matrices, each of which represent a channel matrix on a certain RE. Usually, they have the same subcarrier index. Here, Nr and Nt represent the number of receiving antennas and the number of transmitting antennas respectively. Here, the antenna can be a logical antenna, that is, a precoded antenna port. In this embodiment, the MCS corresponding to the data PDSCH2 on the second symbol set is generally larger than the MCS corresponding to the data PDSCH1 on the first symbol set, and the larger the MCS, the higher the modulation and coding scheme order and/or the higher the coding rate. In this embodiment, generally, the transmission power corresponding to the data PDSCH2 on the second symbol set is not greater than the transmission power corresponding to the data PDSCH1 on the first symbol set.

On the basis of the above embodiment of the present disclosure, whether the first symbol set is a Null set (that is, the first symbol set includes 0 symbol, and the base station only uses the second symbol set to transmit data) can be determined by one of the following approaches. In a first approach, whether there is a first symbol set for demodulating and transmitting data is indicated by the base station through the higher-layer signaling and/or the physical layer signaling. The terminal device determines whether there is the first symbol set by receiving the higher-layer signaling and/or the physical layer signaling. In a second approach, the base station implicitly indicates to the terminal device through at least two groups of power control parameters that there are two different symbol sets for data transmission on a scheduled resource, namely, a first symbol set and a second symbol set. If the terminal device receives at least two groups of power control parameters, it is determined that there is a first symbol set. In a third approach, the base station implicitly indicates to the terminal device through at least two groups of modulation and coding scheme parameters that there are two different symbol sets for data transmission on a scheduled resource, namely, a first symbol set and a second symbol set. If the terminal device receives at least two groups of modulation and coding scheme parameters, it is determined that there is a first symbol set.

On the basis of the above embodiment of the present disclosure, the base station or the terminal device determines the number of symbols in the first symbol set and the indexes of the symbols on the scheduled resource according to the type of cyclic prefix. Here, the type of cyclic prefix includes normal cyclic prefix (NCP) and extended cyclic prefix (ECP). As shown in Table 1 of the previous example, ECP scheduling corresponds to rows with $l_d$ less than or equal to 12, while NCP corresponds to rows with $l_d$ less than or equal to 14.

On the basis of the above embodiment of the present disclosure, the base station or the terminal device determines the number of symbols in the first symbol set and the indexes of the symbols on the scheduled resource according to the number of symbols of the DMRS. Here, the number of symbols of the DMRS is configured through the higher-layer signaling, which means that K2 symbols with consecutive indexes are configured to transmit the DMRS, for example, K2=1,2, K2=1 in Table 1 and K2=2 in Table 2.

On the basis of the above embodiment of the present disclosure, the base station or the terminal device determines the number of symbols in the first symbol set and the indexes of the symbols on the scheduled resource according to the number of symbols of an additional DMRS. The additional DMRS here refers to a DMRS added in addition to a front loaded DMRS, which is mainly used in scenes with high moving speeds, where the number and position of the added DMRSs are determined by the parameter dmrs-AdditionalPosition, and the value can be 0-3, such as the column corresponding to dmrs-AdditionalPosition=0-3 in Table 1 or Table 2.

On the basis of the above embodiment of the present disclosure, the base station or the terminal device determines the number of symbols in the first symbol set and the indexes of the symbols on the scheduled resource according to the number of symbols of a DMRS hopping enable identifier. Here, when the DMRS hopping enable identifier is enabled, it means that frequency hopping exists on the scheduled resource in the time domain, otherwise, frequency hopping does not occur.

In an example, the base station or the terminal device determines the number of symbols in the first symbol set and the indexes of the symbols on the scheduled resource according to the type of PDSCH mapping. The type of PDSCH mapping here includes PDSCH mapping type A and PDSCH mapping type B, where a resource scheduled by the PDSCH mapping type A includes 3 or more symbols, and the starting position of the scheduled resource is the symbol index 0-3, while a resource scheduled by the PDSCH mapping type B includes 2, 4, 6 and 7 symbols, and the starting position of the scheduled resource is the symbol index 0-12, as shown in the columns corresponding to PDSCH mapping type A and PDSCH mapping type B in Table 1 or Table 2 of the previous example.

In an example, the base station or the terminal device determines the number of symbols in the first symbol set and the indexes of the symbols on the scheduled resource according to the number of symbols $l_d$ of the PDSCH resource. Here, the number of symbols $l_d$ of the PDSCH resource corresponding to PDSCH mapping type A is 3-14, and the number of symbols $l_d$ of the PDSCH resource corresponding to PDSCH mapping type A is 2, 4, 6, and 7, such as the rows corresponding to different values of $l_d$ in Table 1 or Table 2.

In an example, the base station or the terminal device determines the number of symbols in the first symbol set and the indexes of the symbols on the scheduled resource by sending or receiving the higher-layer signaling configuration respectively.

In an example, the base station or the terminal device determines the number of symbols in the first symbol set and the indexes of the symbols on the scheduled resource by pre-configuration.

In an example, when the PDSCH under the $j^{th}$ time and $i^{th}$ time of repetition transmission are transmitted by the base station and received by the terminal device, it is determined that the number of REs used for demodulation in the first symbol set corresponding to the $j^{th}$ time of repetition transmission is greater than that in the first symbol set corresponding to the $i^{th}$ time of repetition transmission, where $1<=i<j<=N$.

In an example, when the PDSCH under the $j^{th}$ time and $i^{th}$ time of repetition transmission are transmitted by the base station and received by the terminal device, it is determined that the number of symbols in the first symbol set corresponding to the $j^{th}$ time of repetition transmission is greater than that in the first symbol set corresponding to the $i^{th}$ time of repetition transmission, where $1<=i<j<=N$.

In an example, when the PDSCH under the $j^{th}$ time and $i^{th}$ time of repetition transmission are transmitted by the base station and received by the terminal device, it is determined that the transmission power of the symbols in the first symbol set corresponding to the $j^{th}$ time of repetition transmission is greater than that of the symbols in the first symbol set corresponding to the $i^{th}$ time of repetition transmission, where $1<=i<j<=N$.

In an example, after receiving the $i^{th}$ time of repetition transmission, the terminal device will feed back ACK if demodulation is successful, and the base station will stop the $K^{th}$ to $N^{th}$ time of repetition transmission after receiving the ACK fed back by the terminal device, where $1<=i<k<=N$.

In an implementation, taking repetition transmission of PUSCH as an example, in this embodiment, a transmission point (such as a base station) configures N repetition transmissions through the higher-layer signaling and/or the physical layer signaling, where N is an integer greater than or equal to 2. The N repetition transmissions can be sent in different slots or sub slots by at least one panel of the terminal device, and received in different slots or sub slots by at least one panel of at least one base station. The N repetition transmissions can also be sent by at least one panel of the base station through space division multiplexing or frequency division multiplexing, and received by at least one panel of at least one base station through space division multiplexing or frequency division multiplexing.

In this embodiment, the base station configures K sets of PUSCH patterns through the higher-layer signaling, and the K sets of PUSCH patterns are used for N repetition transmissions of the PUSCH. Alternatively, one set of PUSCH patterns is configured, and the other K−1 sets are pre-configured according to the first set of PUSCH patterns and an agreement between the base station and the terminal device. Alternatively, the K sets of PUSCH patterns are all pre-configured according to the agreement between the base station and the terminal device. Here, the pre-configured PUSCH pattern does not need to be sent to the terminal device by the base station through a signaling, but configuration information of the configured PUSCH pattern needs to be sent by the base station to the terminal device through a signaling, and the signaling here includes a higher-layer signaling and/or a physical layer signaling. The PUSCH pattern includes a first symbol set, a second symbol set, and a third symbol set, where the first symbol set and the second symbol set are configured to transmit PUSCH, and the third symbol set is configured to transmit DMRS. K is an integer greater than or equal to 1, N is an integer greater than 1, and N is greater than or equal to K.

The terminal device obtains the K sets of PUSCH patterns by receiving the signaling sent by the base station or by pre-configuration.

In an embodiment, the number of symbols in the first symbol set is not null, that is, greater than or equal to one. The terminal device transmits PUSCH1 with the RE on the first symbol set, but MCS is agreed by the base station and the terminal device, such as quadrature phase shift keying (QPSK) or binary phase shift keying (BPSK). The terminal device transmits PUSCH2 with the RE on the second symbol set, and the third symbol set is configured to transmit DMRS. The base station receives PUSCH1 on the first symbol set, PUSCH2 on the second symbol set, and DMRS on the third symbol set. In this way, the base station can estimate the corresponding channel information H3 using the received DMRS of the third symbol set, estimate the channel information H1 corresponding to the first symbol set according to the channel information H3 corresponding to the third symbol set, demodulate the corresponding transmission data on the first symbol set according to H1, and then estimate the corresponding channel H1' again according to the corresponding data on the first symbol set as a pilot and the received data on the first symbol set. Therefore, the RE on the first symbol set also plays the role of the DMRS, and estimates the channel information H2 on the second symbol set by interpolation (such as linear interpolation) according to H1' and H3. Here, H1, H1', H2, and H3 are all Nr*Nt complex matrices, each of which represent a channel matrix on a certain RE. Usually, they have the same subcarrier index. where Nr and Nt represent the number of receiving antennas and the number of transmitting antennas respectively. Here, the antenna can be a logical antenna, that is, a precoded antenna port. In this embodiment, the MCS corresponding to the data PUSCH2 on the second symbol set is generally larger than the MCS corresponding to the data PUSCH1 on the first symbol set, and the larger the MCS, the higher the modulation and coding scheme order and/or the higher the coding rate. In this embodiment, generally, the transmission power corresponding to the data PUSCH2 on the second symbol set is not greater than the transmission power corresponding to the data PUSCH1 on the first symbol set.

In an example, whether the first symbol set is a Null set (that is, the first symbol set includes 0 symbol, and the terminal device only uses the second symbol set to transmit data) is determined by one of the following approaches. In a first approach, whether there is a first symbol set for demodulating and transmitting data is indicated by the base station through the higher-layer signaling and/or the physical layer signaling. The terminal device determines whether there is the first symbol set by receiving the higher-layer signaling and/or the physical layer signaling. In a second approach, the base station implicitly indicates to the terminal device through at least two groups of power control parameters that there are two different symbol sets for data transmission on a scheduled resource, namely, a first symbol set and a second symbol set. If the terminal device receives at least two groups of power control parameters, it is determined that there is a first symbol set. In a third approach, the base station implicitly indicates to the terminal device through at least two groups of modulation and coding scheme parameters that there are two different symbol sets for data transmission on a scheduled resource, namely, a first symbol set and a second symbol set. If the terminal device receives at least two groups of modulation and coding scheme parameters, it is determined that there is a first symbol set.

In an example, the base station or the terminal device determines the number of symbols in the first symbol set and the indexes of the symbols on the scheduled resource according to the type of cyclic prefix. Here, the type of cyclic prefix includes normal cyclic prefix (NCP) and extended cyclic prefix (ECP). As shown in Table 3 of the previous example, ECP scheduling corresponds to rows with $l_d$ less than or equal to 12, while NCP corresponds to rows with $l_d$ less than or equal to 14.

In an example, the base station or the terminal device determines the number of symbols in the first symbol set and the indexes of the symbols on the scheduled resource according to the number of symbols of the DMRS. Here, the number of symbols of the DMRS is configured through the higher-layer signaling, which means that K2 symbols with consecutive indexes are configured to transmit the DMRS, for example, K2=1,2, K2=1 in Table 3 and K2=2 in Table 4.

In an example, the base station or the terminal device determines the number of symbols in the first symbol set and the indexes of the symbols on the scheduled resource according to the number of symbols of an additional DMRS. The additional DMRS here refers to a DMRS added in addition to a front loaded DMRS, which is mainly used in scenes with high moving speeds, where the number and position of the added DMRSs are determined by the parameter dmrs-AdditionalPosition, and the value can be 0-3, such as the column corresponding to dmrs-AdditionalPosition=0-3 in Table 3 or Table 4.

In an example, the base station or the terminal device determines the number of symbols in the first symbol set and the indexes of the symbols on the scheduled resource according to the number of symbols of a DMRS hopping enable identifier. Here, when the DMRS hopping enable identifier is enabled, it means that frequency hopping exists on the scheduled resource in the time domain, otherwise, frequency hopping does not occur, as shown in Table 5.

In an example, the base station or the terminal device determines the number of symbols in the first symbol set and the indexes of the symbols on the scheduled resource according to the type of PUSCH mapping. The type of PUSCH mapping here includes PUSCH mapping type A and PUSCH mapping type B, where a resource scheduled by the PUSCH mapping type A includes 4 or more symbols, and the starting position of the scheduled resource is the symbol index 0, while a resource scheduled by the PUSCH mapping type B includes 1-14 symbols, and the starting position of the scheduled resource is the symbol index 0-13, as shown in the columns corresponding to PUSCH mapping type A and PUSCH mapping type B in Table 3 or Table 4 of the previous example.

In an example, the base station or the terminal device determines the number of symbols in the first symbol set and the indexes of the symbols on the scheduled resource according to the number of symbols $l_d$ of the PUSCH resource. Here, the number of symbols $l_d$ of the PUSCH resource corresponding to PUSCH mapping type A is 4-14, and the number of symbols $l_d$ of the PUSCH resource corresponding to PUSCH mapping type A is 1-14, such as the rows corresponding to different values of $l_d$ in Table 3 or Table 4.

In an example, the base station or the terminal device determines the number of symbols in the first symbol set and the indexes of the symbols on the scheduled resource by sending or receiving the higher-layer signaling configuration respectively.

In an example, the base station or the terminal device determines the number of symbols in the first symbol set and the indexes of the symbols on the scheduled resource by pre-configuration.

In an example, when the PUSCH under the $j^{th}$ time and $i^{th}$ time of repetition transmission are transmitted by the terminal device and received by the base station, it is determined that the number of REs used for demodulation in the first symbol set corresponding to the $j^{th}$ time of repetition transmission is greater than that in the first symbol set corresponding to the $i^{th}$ time of repetition transmission, where $1<=i<j<=N$.

In an example, when the PUSCH under the $j^{th}$ time and $i^{th}$ time of repetition transmission are transmitted by the terminal device and received by the base station, it is determined that the number of symbols in the first symbol set corresponding to the $j^{th}$ time of repetition transmission is greater than that in the first symbol set corresponding to the $i^{th}$ time of repetition transmission, where $1<=i<j<=N$.

In an example, when the PUSCH under the $j^{th}$ time and $i^{th}$ time of repetition transmission are transmitted by the terminal device and received by the base station, it is determined that the transmission power of the symbols in the first symbol set corresponding to the $j^{th}$ time of repetition transmission is greater than that of the symbols in the first symbol set corresponding to the $i^{th}$ time of repetition transmission, where $1<=i<j<=N$.

In an example, after receiving the $i^{th}$ time of repetition transmission, the base station will feed back ACK, or no longer allocate resources for repetition transmission to UE, or send a signaling to the terminal device to stop repetition transmission if demodulation is successful, and the terminal device will stop the $K^{th}$ to $N^{th}$ time of repetition transmission after receiving the ACK fed back by the base station, or stopping having resources for repetition transmission, or receiving the signaling for stopping repetition transmission sent by the base station, where $1<=i<k<=N$.

Figure 7:
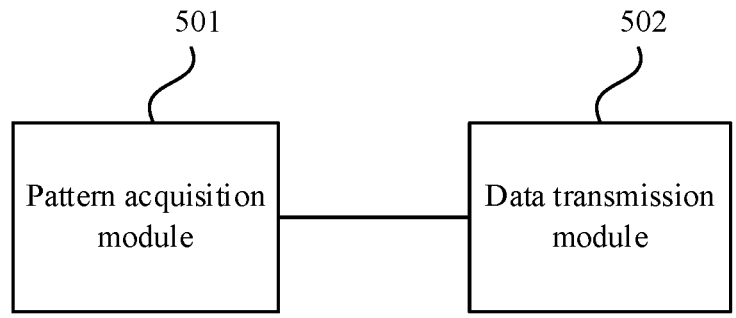
FIG. 7 is a schematic diagram of a data transmission apparatus provided by an embodiment of the present disclosure.

FIG. 7 is a schematic diagram of a data transmission apparatus provided by an embodiment of the present disclosure, which can execute the data transmission method provided by any embodiment of the present disclosure, corresponding functional modules and effects of the method specifically. The apparatus can be implemented by software and/or hardware and includes: a pattern acquisition module 501 and a data transmission module 502.

The pattern acquisition module 501 is configured to acquire K physical shared channel patterns.

The data transmission module 502 is configured to perform repetition transmission on data to be transmitted according to the K physical shared channel patterns, where K is an integer greater than 1.

According to the technical scheme of the embodiments of the present disclosure, by acquiring at least two physical shared channel patterns, the data transmission module 502 performs repetition transmission on the data to be transmitted according to the physical shared channel patterns, so that high-reliability data transmission is realized, and resource occupation in repetition transmission is reduced.

On the basis of the above embodiment of the present disclosure, the physical shared channel patterns in the data transmission apparatus include at least two types of physical shared channel patterns.

On the basis of the above embodiment of the present disclosure, each of the physical shared channel patterns in the data transmission apparatus at least includes a first symbol set, a second symbol set and a third symbol set, where the first symbol set and the second symbol set are configured to transmit data; and the third symbol set is configured to transmit a DMRS.

On the basis of the above embodiment of the present disclosure, the data transmission apparatus further includes: a sending module configured to transmit the physical shared channel pattern through a higher-layer and/or physical layer signaling.

On the basis of the above embodiment of the present disclosure, the data transmission module 502 further includes: a configuration module configured to determine the physical shared channel patterns.

On the basis of the above embodiment of the present disclosures, the configuration module is configured to: determine the number of symbols and symbol index values in the first symbol set; determine the number of symbols and symbol index values in the second symbol set; and determine the number of symbols and symbol index values in the third symbol set.

On the basis of the above embodiment of the present disclosure, a symbol determination unit determines the number of symbols and values in the first symbol set according to at least one of: type of cyclic prefix, number of consecutive DMRS symbols, total number of DMRSs, number of enhanced DMRSs, frequency hopping of DMRSs, mapping type of physical shared channel, number of scheduled symbols of physical shared channel, higher-layer signaling configuration or pre-configuration.

On the basis of the above embodiment of the present disclosure, the data transmission module 502 includes:

a pattern acquisition unit configured to acquire a physical shared channel pattern from the plurality of physical shared channel patterns;

a data sending unit configured to transmit the data to be transmitted according to the physical shared channel pattern to the receiver through the physical shared channel;

a condition determining unit configured to determine whether a transmission stop condition is met, if yes, stop the sending of the data to be transmitted, and otherwise, return to the step of acquiring a physical shared channel pattern from the plurality of physical shared channel patterns.

On the basis of the above embodiment of the present disclosure, the transmission stop condition in the condition determining unit includes at least one of: the number of times of sending the data to be transmitted being greater than or equal to a repetition transmission threshold; or a reception success signal fed back by the receiver being acquired.

On the basis of the above embodiment of the present disclosure, the physical shared channel in the data transmission unit includes at least one of: a PUSCH or a PDSCH.

On the basis of the above embodiment of the present disclosure, the data sending unit includes: an empty set processing subunit configured to determine whether the first symbol set in the physical shared channel pattern is an empty set with discrimination information, and if yes, only send the second symbol set and the third symbol set.

On the basis of the above embodiment of the present disclosure, the discrimination information in the empty set processing subunit includes at least one of: the higher-layer signaling, the physical layer signaling, the number of power control parameters included in the physical shared channel, or the number of modulation and coding scheme parameters included in the physical shared channel.

On the basis of the above embodiment of the present disclosure, when repetition transmission is performed by the data transmission module 502 on the data to be transmitted according to the K physical shared channel patterns, transmission power of the data corresponding to the first symbol set in the physical shared channel pattern is greater than that of the data corresponding to the second symbol set.

On the basis of the above embodiment of the present disclosure, when repetition transmission is performed by the data transmission module 502 on the data to be transmitted according to the K physical shared channel patterns, transmission power of the data corresponding to the first symbol set in the physical shared channel pattern is greater than that of the data corresponding to the second symbol set.

On the basis of the above embodiment of the present disclosure, when repetition transmission is performed by the data transmission module 502 on the data to be transmitted according to the K physical shared channel patterns, the first symbol set meets at least one of the following requirements during transmission: with the increase of the number of times of transmission of the data to be transmitted, the number of pilots used for demodulation in the first symbol set gradually increases; with the increase of the number of times of transmission of the data to be transmitted, the number of symbols in the first symbol set gradually increases; or with the increase of the number of times of transmission of the data to be transmitted, the transmission power of the symbols in the first symbol set gradually increases.

Figure 8:
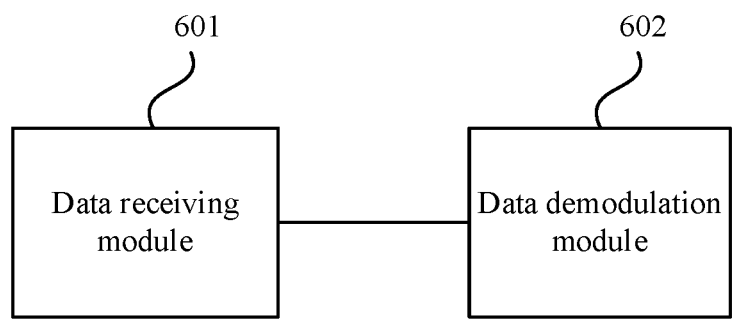
FIG. 8 is a schematic diagram of a data transmission apparatus provided by an embodiment of the present disclosure.

FIG. 8 is a schematic diagram of a data transmission apparatus provided by an embodiment of the present disclosure, which can execute the data transmission method provided by any embodiment of the present disclosure, corresponding functional modules and effects of the method specifically. The apparatus can be implemented by software and/or hardware and includes: a data receiving module 601 and a data demodulation module 602.

The data receiving module 601 is configured to receive at least one datum to be transmitted.

The data demodulation module 602 is configured to demodulate the data to be transmitted according to at least one physical shared channel pattern.

According to the technical scheme of the embodiment of the present disclosure, by receiving the data to be transmitted sent by the sender using the data receiving module 601 and demodulating the data to be transmitted through the physical shared channel pattern using the data demodulation module 602, high-reliability data transmission is realized, and resource occupation in repetition transmission is reduced.

On the basis of the above embodiment of the present disclosure, the data transmission apparatus further includes: a feedback module configured to feed back a reception success signal in response to determining that demodulation is successful.

On the basis of the above embodiment of the present disclosure, the data demodulation module 602 includes:
- a first channel unit configured to determine first channel information according to third channel information of the third symbol set in the physical shared channel pattern;
- a second channel unit configured to determine second channel information according to the third channel information and/or the first channel information;
- a data transmission unit configured to demodulate transmission data corresponding to the first symbol set in the data to be transmitted according to the first channel information, and transmission data corresponding to the second symbol set in the data to be transmitted according to the second channel information.

On the basis of the above embodiment of the present disclosures, each of the physical shared channel patterns in the data demodulation module 602 at least includes: a first symbol set, a second symbol set and a third symbol set; where the first symbol set and the second symbol set are used for transmitting data; and the third symbol set is configured to transmit a DMRS.

On the basis of the above embodiment of the present disclosure, the modulation and coding scheme order of the transmission data corresponding to the first symbol set in the data demodulation module 602 is smaller than that of the second symbol set.

On the basis of the above embodiment of the present disclosure, the transmission power of the transmission data corresponding to the first symbol set in the data demodulation module 602 is greater than that of the second symbol set.

Figure 9:
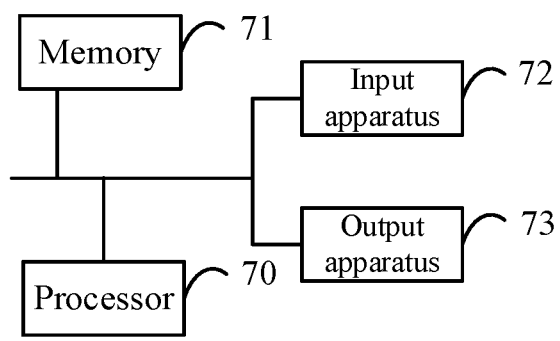
FIG. 9 is a schematic diagram of a device provided by an embodiment of the present disclosure.

FIG. 9 is a schematic diagram of a device provided by an embodiment of the present disclosure. Referring to FIG. 9, the device includes a processor 70, a memory 71, an input apparatus 72 and an output apparatus 73. There may be at least one processor 70 in the device, and one processor 70 is shown as an example in FIG. 9. The processor 70, the memory 71, the input apparatus 72, and the output apparatus 73 in the device can be connected by a bus or in other ways. In FIG. 9, the connection is realized by a bus as an example.

As a computer readable storage medium, the memory 71 can be configured to store software programs, computer executable programs and modules, such as the modules corresponding to the data transmission apparatus in the embodiments of the present disclosure (the pattern acquisition module 501, the data transmission module 502, the data receiving module 601 and the data demodulation module 602). The processor 70 executes various functional applications of the device as well as data processing by running the software programs, instructions, and modules stored in the memory 71, i.e., to implement any of the transmission methods mentioned above.

The memory 71 may mainly include a storage program area and a storage data area, where the storage program area may store an operating system and application program(s) required by at least one function, and the storage data area may store data created according to the use of a terminal device, etc. In addition, the memory 71 may include a high-speed random access memory and a non-volatile memory, for example, at least one magnetic disk storage device, a flash memory device, or another non-volatile solid-state storage device. In some examples, the memory 71 may include memories remotely located with respect to the processor 70, and these remote memories may be connected to devices via a network. Examples of the above-mentioned network include the Internet, an intranet, a local area network, a mobile communication network, and a combination thereof.

The input apparatus 72 may be configured to receive an input numerical digit or character information and generate a key signal input related to user settings and function control of the device. The output apparatus 73 may include a display device such as a display screen.

A further embodiment of the present disclosure provides a storage medium including computer-executable instructions which, when executed by a computer processor, cause a data transmission method to be performed, the method including: acquiring K physical shared channel patterns; and performing repetition transmission on data to be transmitted according to the K physical shared channel patterns, where K is an integer greater than 1. Alternatively, the method includes: receiving at least one datum to be transmitted; and demodulating the data to be transmitted according to at least one physical shared channel pattern.

An embodiment of the present disclosure provides a storage medium including computer-executable instructions, where the computer-executable instructions are not limited to the method operations as described above, but may also perform the relevant operations in the data transmission method according to any embodiment of the present disclosure.

Through the description of the above implementations, the present disclosure may be implemented by means of software and necessary general-purpose hardware, and may alternatively be implemented by hardware. The technical schemes of the present disclosure may be embodied substantially in the form of software products, which may be stored in a computer-readable storage medium (such as a floppy disk, read-only memory (ROM), random access memory (RAM), flash, hard disk and optical disk) and include instructions to cause a computing device (such as a personal computer, a server, or a network device) to perform the methods of the embodiments of the present disclosure.

The term "user terminal device" covers any suitable type of wireless user equipment, such as mobile phones, portable data processing equipment, portable web browsers or vehicle-mounted mobile stations.

Generally speaking, various embodiments of the present disclosure can be implemented in hardware or dedicated circuits, software, logic or any combination thereof. For example, some aspects can be implemented in hardware, while other aspects can be implemented in firmware or software that can be executed by a controller, a microprocessor or another computing device. However, the present disclosure is not limited thereto.

Embodiments of the present disclosure can be implemented by a data processor of a mobile device executing computer program instructions, for example, in a processor entity, or by hardware, or by a combination of software and hardware. The computer program instructions may be assembly instructions, Instruction Set Architecture (ISA) instructions, machine instructions, machine-related instructions, microcode, firmware instructions, state setting data or source code or object code written in any combination of one or more programming languages.

The block diagram of any logic process in the drawings of the present disclosure can represent program steps, or can represent interconnected logic circuits, modules and functions, or can represent a combination of program steps and logic circuits, modules and functions. The computer program may be stored in a memory. The memory may be of any type that is suitable for a local technical environment and can be implemented using any suitable data storage technology, for example but not limited to, a read-only memory (ROM), a random-access memory (RAM), optical storage devices and systems (a digital versatile disk (DVD) or a compact disk (CD)). The computer-readable medium may include a non-transitory storage medium. The data processor may be any type suitable for the local technical environment, for example but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

The invention claimed is:

1. A data transmission method which is applied to a sender, comprising:
   acquiring K physical shared channel patterns; and
   performing repetition transmission on data to be transmitted according to the K physical shared channel patterns, wherein K is an integer greater than 1;
   wherein:
   a modulation and coding scheme order of data corresponding to a first symbol set in the physical shared channel pattern is smaller than a modulation and coding scheme order of data corresponding to a second symbol set in the physical shared channel pattern; or
   transmission power of data corresponding to a first symbol set in the physical shared channel pattern is greater than transmission power of data corresponding to a second symbol set in the physical shared channel pattern.

2. The method of claim 1, wherein:
   the physical shared channel pattern comprises the first symbol set, the second symbol set, and a third symbol set,
   the first symbol set and the second symbol set are both configured to transmit data; and
   the third symbol set is configured to transmit a demodulation reference signal (DMRS).

3. The method of claim 2, wherein the first symbol set in the K physical shared channel patterns meets at least one of the following requirements during transmission:
   with the increase of the number of times of transmission of the data to be transmitted, the number of pilots used for demodulation in the first symbol set in the K physical shared channel patterns gradually increases;
   with the increase of the number of times of transmission of the data to be transmitted, the number of symbols in the first symbol set in the K physical shared channel patterns gradually increases; or
   with the increase of the number of times of transmission of the data to be transmitted, transmission power of symbols in the first symbol set in the K physical shared channel patterns gradually increases.

4. The method of claim 1, further comprising:
   transmitting the K physical shared channel patterns through at least one of a higher-layer signaling or a physical layer signaling.

5. The method of claim 1, further comprising:
   determining the physical shared channel patterns.

6. The method of claim 5, wherein determining the physical shared channel patterns comprises at least one of:
   determining the number of symbols and symbol index values in the first symbol set in the physical shared channel pattern;
   determining the number of symbols and symbol index values in the second symbol set in the physical shared channel pattern; or
   determining the number of symbols and symbol index values in a third symbol set in the physical shared channel pattern.

7. The method of claim 6, wherein the number of symbols and symbol index values in the first symbol set in the physical shared channel pattern are determined based on at least one of:
   a type of cyclic prefix,
   number of consecutive DMRS symbols,
   total number of DMRSs, number of enhanced DMRSs,
   frequency hopping of DMRSs,
   mapping type of physical shared channel,
   number of scheduled symbols of physical shared channel,
   higher-layer signaling configuration or pre-configuration.

8. The method of claim 1, wherein performing repetition transmission on data to be transmitted according to the K physical shared channel patterns comprises:
   acquiring a physical shared channel pattern from the K physical shared channel patterns;
   transmitting the data to be transmitted according to the acquired physical shared channel pattern; and
   determining whether a transmission stop condition is met,
      in response to the transmission stop condition being met, stopping sending the data to be transmitted, and
      in response to the transmission stop condition being not met, returning to the step of acquiring a physical shared channel pattern from the K physical shared channel patterns.

9. The method of claim 8, wherein the transmission stop condition comprises at least one of:
   the number of times of sending the data to be transmitted being greater than or equal to a repetition transmission threshold; or
   a reception success signal fed back by a receiver being acquired.

10. The method of claim 8, wherein transmitting the data to be transmitted according to the acquired physical shared channel pattern comprises:
    determining whether the first symbol set in the acquired physical shared channel pattern is an empty set with discrimination information, and
    if yes, only transmitting the second symbol set and a third symbol set in the physical shared channel pattern.

11. The method of claim 10, wherein the discrimination information comprises at least one of:
- a higher-layer signaling,
- a physical layer signaling,
- the number of power control parameters in a physical shared channel, or
- the number of modulation and coding scheme parameters in the physical shared channel.

12. A device, comprising:
- at least one processor; and
- a memory configured to store at least one program, wherein
  - the at least one program, when executed by the at least one processor, causes the at least one processor to implement the data transmission method of claim 1.

13. A non-transitory computer-readable storage medium storing a computer program, wherein the computer program, when executed by a processor, causes the processor to implement the data transmission method of claim 1.

14. A data transmission method which is applied to a receiver, the data transmission method comprising:
- receiving data to be transmitted acquired through at least one time of repetition transmission; and
- demodulating the data to be transmitted according to at least one physical shared channel pattern;

wherein:
- a modulation and coding scheme order of data corresponding to a first symbol set in the physical shared channel pattern is smaller than a modulation and coding scheme order of data corresponding to a second symbol set in the physical shared channel pattern; or
- transmission power of data corresponding to a first symbol set in the physical shared channel pattern is greater than transmission power of data corresponding to a second symbol set in the physical shared channel pattern.

15. The method of claim 14, after demodulating the data to be transmitted according to at least one physical shared channel pattern, further comprising:
- in response to determining that demodulation is successful, feeding back a reception success signal.

16. The method of claim 14, wherein demodulating the data to be transmitted according to at least one physical shared channel pattern comprises:
- determining first channel information according to third channel information of a third symbol set in the physical shared channel pattern;
- determining second channel information according to at least one of the third channel information or the first channel information; and
- demodulating transmission data corresponding to the first symbol set of the physical shared channel pattern in the data to be transmitted according to the first channel information, and demodulating transmission data corresponding to the second symbol set of the physical shared channel pattern in the data to be transmitted according to the second channel information.

17. A device, comprising:
- at least one processor; and
- a memory configured to store at least one program, wherein
  - the at least one program, when executed by the at least one processor, causes the at least one processor to implement the data transmission method of claim 14.

18. A non-transitory computer-readable storage medium storing a computer program, wherein the computer program, when executed by a processor, causes the processor to implement the data transmission method of claim 14.

* * * * *